(12) United States Patent
Cimaz

(10) Patent No.: US 8,904,202 B2
(45) Date of Patent: Dec. 2, 2014

(54) SELECTIVE CONFIGURATION OF A NODE OF AN ELECTRONIC CIRCUIT COMPONENT

(75) Inventor: Lionel Cimaz, Pleumeleuc (FR)

(73) Assignees: ST-Ericsson SA, Plan-les-Ouates (CH); ST-Ericsson (France) SAS, Grenoble (FR)

( * ) Notice: Subject to any disclaimer, the term of this patent is extended or adjusted under 35 U.S.C. 154(b) by 201 days.

(21) Appl. No.: 13/391,041

(22) PCT Filed: Aug. 19, 2010

(86) PCT No.: PCT/EP2010/062113
§ 371 (c)(1),
(2), (4) Date: Feb. 17, 2012

(87) PCT Pub. No.: WO2011/020884
PCT Pub. Date: Feb. 24, 2011

(65) Prior Publication Data
US 2012/0159213 A1    Jun. 21, 2012

(30) Foreign Application Priority Data
Aug. 19, 2009  (EP) .................................. 09305771

(51) Int. Cl.
*G01P 21/00* (2006.01)
*G06F 1/32* (2006.01)

(52) U.S. Cl.
CPC ............ *G06F 1/3206* (2013.01); *G06F 1/3287* (2013.01)
USPC ............ 713/300; 713/500; 702/108; 702/117

(58) Field of Classification Search
USPC .......................... 713/300, 500; 702/108, 117
See application file for complete search history.

(56) References Cited

U.S. PATENT DOCUMENTS

| 5,057,699 A | 10/1991 | Spence |
| 5,671,148 A * | 9/1997 | Urano et al. .................... 702/65 |

(Continued)

FOREIGN PATENT DOCUMENTS

| EP | 1 890 220 A2 | 2/2008 |
| JP | 61199321 A | 9/1986 |

(Continued)

OTHER PUBLICATIONS

Extended European Search Report issued in corresponding European Patent Application No. 09305771.9, dated Jun. 29, 2010.
International Search Report issued in corresponding International Application No. PCT/EP2010/062113, mailed Dec. 7, 2010.

(Continued)

*Primary Examiner* — Vincent Tran
(74) *Attorney, Agent, or Firm* — Patent Portfolio Builders PLLC

(57) ABSTRACT

A component of an electronic circuit, the component comprising: a node (REG_ENB; DO) selectively configurable as an output node for providing an output signal to an external component or as an input node for providing an input signal to an internal component; a capacitor (C) selectively coupled to the node (REG_ENB; DO) to influence the time for the node (REG_ENB; DO) to transition between a low state and a high state; and a timer for measuring the time for the node to transition between a low state and a high state to provide a first information input signal, the state of the first information signal depending on the time for the node to transition between the low state and the high state and being indicative of a first information. A method of node management is also described.

14 Claims, 3 Drawing Sheets

(56) References Cited

U.S. PATENT DOCUMENTS

| | | | |
|---|---|---|---|
| 6,349,267 B1* | 2/2002 | Goldthorp et al. | 702/69 |
| 2001/0043104 A1* | 11/2001 | Suzuki | 327/284 |
| 2005/0127955 A1* | 6/2005 | Martinez et al. | 327/108 |
| 2007/0226383 A1* | 9/2007 | Chung et al. | 710/29 |
| 2008/0157844 A1* | 7/2008 | Ren | 327/290 |
| 2010/0177578 A1* | 7/2010 | King | 365/194 |
| 2011/0285365 A1* | 11/2011 | de Cremoux et al. | 323/271 |

FOREIGN PATENT DOCUMENTS

| | | |
|---|---|---|
| WO | 94/01935 A1 | 1/1994 |
| WO | 02/21223 A1 | 3/2002 |

OTHER PUBLICATIONS

Written Opinion issued in corresponding International Application No. PCT/EP2010/062113, mailed Dec. 7, 2010.

\* cited by examiner

SELECTIVE CONFIGURATION OF A NODE OF AN ELECTRONIC CIRCUIT COMPONENT

FIELD OF THE INVENTION

The present invention relates to a node management of an electronic circuit chip component. Particularly, but not exclusively, the invention relates to node management of a power management sequencer unit (PSEQ).

BACKGROUND OF THE INVENTION

With the development of faster and more powerful processors in many electronic devices power consumption has become an issue of increasing importance, in particular with regard to mobile electronic devices with limited power sources. Mobile devices such as, but not limited to, mobile telephones, personal data appliances, personal digital assistants (PDAs), lap top computers and the like, are sometimes required to operate for long periods of time before their power source can be recharged.

Accordingly, such portable devices implement some form of power management scheme where functional components of the device, such as processors, memories, interfaces, radios, physical layers (PHYs), power regulators, crystal oscillators etc of the device can be placed in two or more different power modes.

A power management unit sequencer block, sometimes referred to as a PSEQ (Power SEQuencer) can be used to control the enabling of different power modes of one or more components of an electronic device. Such a unit needs to handle a number of different inputs and outputs. For example, a typical PSEQ may include:

- 2 power ON inputs to capture a user power-up command;
- an external regulator enable (REG_EN) output to trigger the power-up of any power regulator present in the electronic device.
- a <<configuration>> (CONFIG) input used in general to set the voltage of a power regulator.
- a test mode enable (TM_EN) input to engage a PSEQ test mode used for production testing.
- A test mode serial digital interface to give PSEQ access to the production test machine when test mode is enabled. Such a serial interface has in general 3 inputs (serial in, capture) and 1 output (serial out). The serial CLK is provided by indirect means since it can be shared with other cells in the chip.

In some designs of PMU sequencer blocks, each node of the PSEQ is mapped to a specific function.

Other functional block components of integrated circuits and the like are also provided with a limited number of nodes. Usually each node of such components are mapped to a specific input or output function.

In some cases multiplexing of input and or output signals can be used. Analogue comparators may also be implemented to increase multiplexing capability. Such approaches require specific number of nodes to cover the I/O functions. The use of analogue cells may also lead to an increase in current consumption.

SUMMARY OF THE INVENTION

In view of the foregoing, a first aspect of the invention provides a component of an electronic circuit, the component comprising: a node selectively configurable as an output node for providing an output signal to an external component or as an input node for providing an input signal to an internal component; a capacitor which can be selectively coupled to the node to influence the time for the node to transition between a low state and a high state; and a timer for measuring the time for the node to transition between a low state and a high state to provide a first information input signal, the state of the first information signal depending on the time for the node to transition between the low state and the high state and being indicative of a first information.

A second aspect of the invention provides method of managing a node of a component of an electronic circuit, the method comprising: selectively coupling a capacitor to the node to influence the time for the node to transition between a low state and a high state; and measuring the time for the node to transition between a low state and a high state to provide a first information input signal, the state of the first information input signal depending on the time for the node to transition between the low state and the high state and providing a first information.

It will be appreciated that the capacitor by influencing the time for the node to transition the node between a high state and a low state the capacitor may influence the time for the node to transition from a low state to a high state or from a high state to a low state.

The methods according to the invention may be computer implemented. The methods may be implemented in software on a programmable apparatus. They may also be implemented solely in hardware or in software, or in a combination thereof.

Since at least parts of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

In the description which follows, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well-known devices, circuits, and methods are omitted so as not to obscure the description of the present invention with unnecessary detail.

A method of an apparatus for managing the node of a component of an IC chip, according to an embodiment of the invention will be described with reference to FIGS. 1 and 2.

Figure 1:
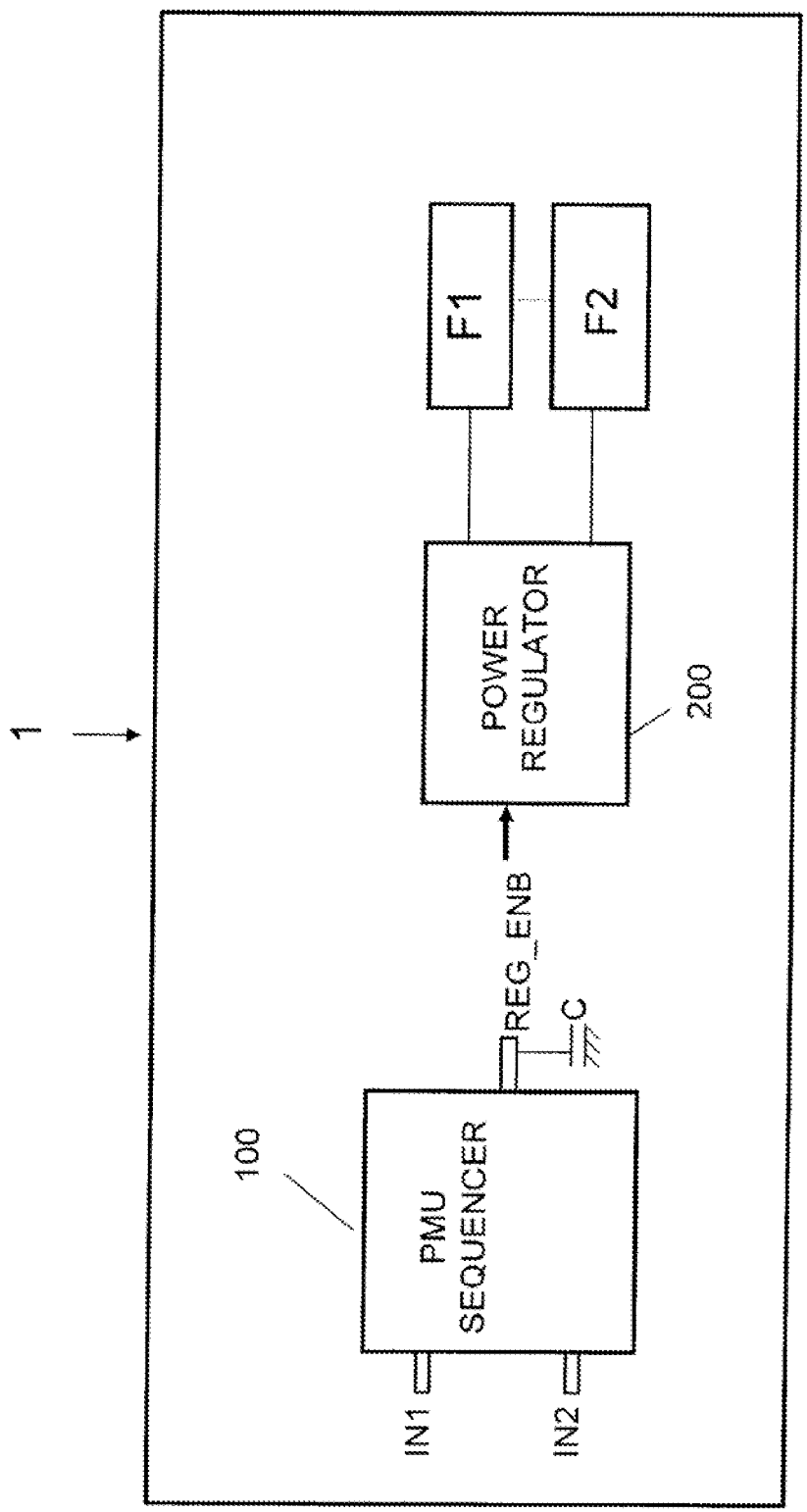
FIG. 1 is a schematic block diagram of an electronic circuit including power sequencer unit PSEQ according to an embodiment of the method.

FIG. 1 is a general schematic block diagram of part of an integrated circuit chip 1 according to an embodiment of the invention. The integrated circuit (IC) chip 1 may be implemented in a wireless communication device such as a mobile telephone based on GSM, GPRS or EDGE chip technology, for example, but it will be appreciated that the method of the invention is not limited thereto and may be applied in any electronic device, mobile or otherwise, in which node management can be implemented. The IC chip 1 includes a PMU sequencer block 100. The PMU sequencer block is provided with two power ON inputs IN1 and IN2 to receive user power up orders and an external regulator output REG_EN to enable the power up of power regulator 200. It will be appreciated that the external regulator output REG_EN may be configured to enable the power up of a plurality of power regulators of the integrated circuit chip. Power regulator 200 supplies functional blocks F1 and F2 with of IC chip 1. It will be appreciated that power regulator 200 may be configured to power one or more components of an IC chip.

In this embodiment the PMU sequencer block 100 can be continually powered and clocked. The functional blocks of the chip 1 can be powered-up or down by enabling internal/external regulators, such as power regulator 200, by means of an external regulator output REG_EN output signal depending on power ON requests received via inputs IN1 and IN2.

In use, the power ON inputs IN1 and IN2 of the PMU sequencer 100 in this embodiment should always be available in functional mode of the IC chip 1, before and after the power-up of the IC chip 1. The power ON inputs IN1 and IN2 do not need to be available in test mode when the IC chip 1 is being tested.

The external regulator enable REG_EN signal is set at a logic 0 state when the IC chip 1 is powered-down and passes to a logic 1 state when the IC chip powers-up. It remains at the logic 1 state while the IC chip is powered-up.

A configuration CONFIG signal for setting the voltage of the power regulator 200 is read when chip powers-up and is typically not required after.

The test mode for enabling a PSEQ test mode for production testing can be engaged whether or not the IC chip is powered-up.

Operation of the PMU sequencer block 100 will now be described.

In functional mode of the IC chip, the external regulator enable signal REG_EN and the 2 power ON keys IN1 and IN2 can be present on independent nodes of power sequencer 100. The other required signals CONFIG, TEST ENABLE etc can be then mapped to these nodes:

In terms of the Configuration signal CONFIG: The configuration state should be acquired at power-up of the IC chip. At power-up, the external regulator enable signal REG_EN passes from a logic 0 state to a logic 1. The time taken by the external regulator enable signal REG_EN to transition from 0 to 1 is measured. This time duration can be adjusted during design of the chip by adding or not adding a capacitor C to the REG_EN line. If the measured time taken by the external regulator enable signal REG_EN to transition from 0 to 1 is low, it will be considered that the configuration state of the REG_EN node is 0. If the measured time is above a time duration threshold, the configuration state of the REG_EN node will be considered to be in state 1.

It will be appreciated that in alternative embodiments of the invention the capacitor arrangement may be arranged to be configurable. A switch and means such as an adjustable resistor for adjusting the rise time may be included.

In terms of test mode enable TM_EN: The regulator enable signal REG_EN is generally static before and after power-up. Before power up it is generally at a 0 or low logic state and at a 1 or high state after. Since the current load on the regulator enable line can generally be very low (it can be typically used to drive CMOS inputs), these states can be maintained by a pull-up or a pull-down resistor. The external regulator enable signal REG_EN can then be forced externally to oppose its logic state. If the regulator enable signal REG_EN is not opposed, the system will consider that the functional mode of operation is selected. If the regulator enable signal REG_EN is opposed, the system will consider that test mode TM_EN is engaged by an external tester.

In terms of test mode serial input and capture: When test mode is enabled using the technique described in the previous paragraph, the 2 power ON inputs IN1 and IN2 are no longer used. Thus, during the test mode, the 2 power ON inputs can be mapped as test serial input and capture. The tester of the device can then access the PSEQ unit 100.

In terms of test mode serial output: At enabling of the test mode, the tester can access the PSEQ unit 100 in write mode only since only serial input and capture signals are available. A specific write command forces test mode enabling independently of the state opposition of the external regulator enable signal REG_EN. In this case, the external regulator enable signal REG_EN is not needed for test mode enabling and the associated node REG_EN can be mapped as a test mode serial output. At this point, the tester can access the PSEQ 100 in write and read mode.

To sum up, the external regulator enable node REG_EN can be configured to provide multiple features:

External regulator enabling

The configuration state CONFIG of a power management by the presence or absence of a capacitor on the REG_EN node.

Test mode enabling by forcing externally the opposition of node state.

Test mode serial output after writing a specific test command to the PSEQ.

The 2 power ON key nodes are configured to provide 2 features:

Power ON key interface test mode serial input and capture when test mode is selected.

Figure 2:
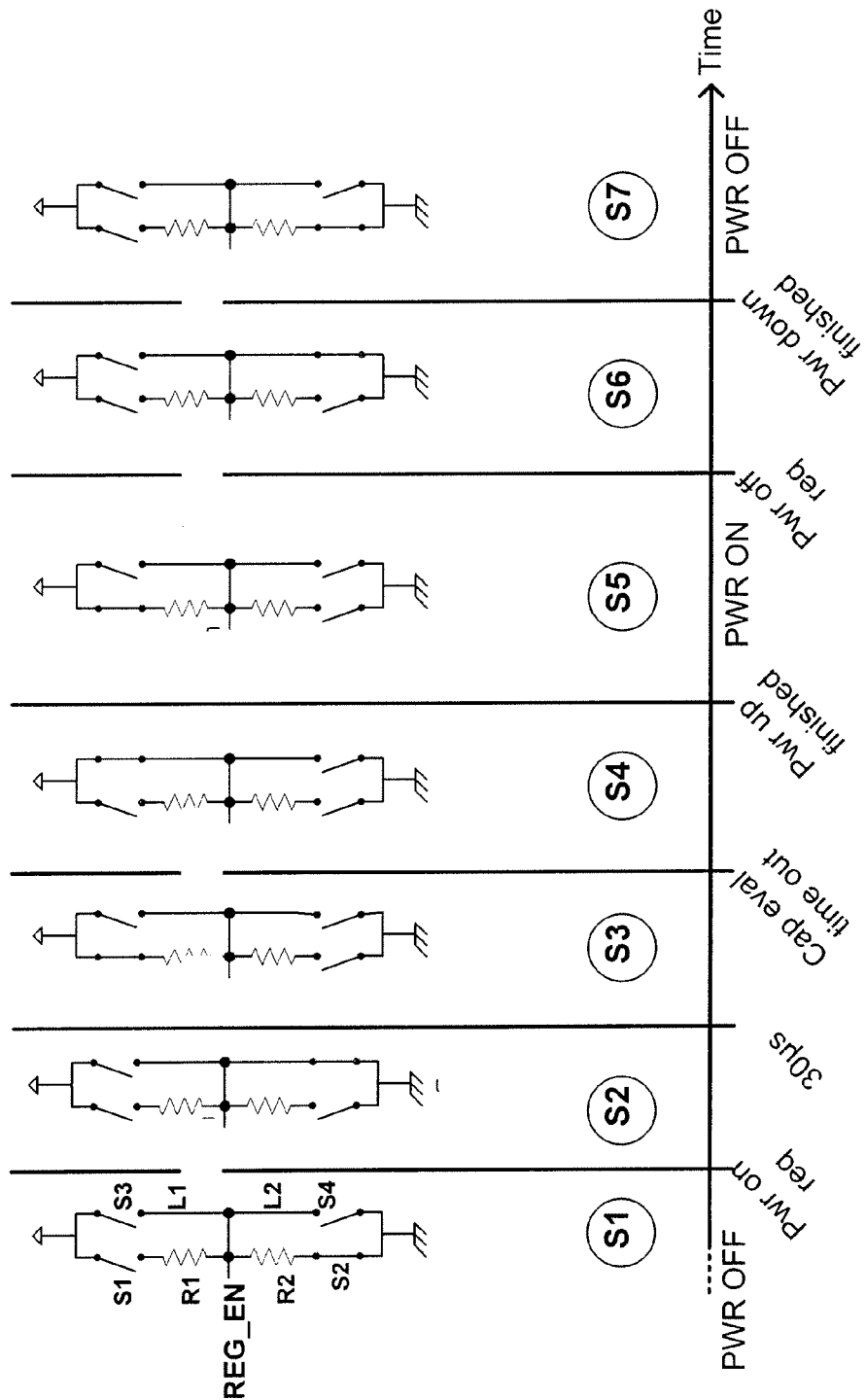
FIG. 2 illustrates the different configurations of a node of an IC component according to the embodiment of the invention.

An embodiment of circuitry used to manage the external regulator enable node REG_EN in order to implement the provision of multiple features is illustrated in FIG. 2. In the embodiment the circuitry is internal to the PSEQ unit 100.

The REG_EN node is coupled to a switch arrangement comprising a pull up resistor R1 which couples the REG_EN node to a power line representing a high state via a switch S1, and a pull down resistor R2 coupling the REG_EN node to ground representing a low state by means of switch S2. The REG_EN node may also be coupled by means of a switch S3 to the high state power line by a low impedance connection L1, and to the low state power line by a low impedance connection L2 via a switch S4.

In phase S1, the IC chip 1 is not powered. The REG_EN is set at a low state (0) by means of closed switch S2 (S1, S3 and S4 open) and pull down resistor R2 providing a closed electrical path between the REG_EN node and the low state line.

At this stage the test mode can be enabled by setting the REG_EN node to a high state i.e. by opposing the logical state of the REG_EN node.

In phase S2 a power on request is received via input IN1 or IN2. The REG_EN node is forced to a low state by closing switch S4 (S1, S2 and S3 open) and thereby providing a low impedance path L2 between the REG_EN node and the low power GND line. This is done before any evaluation of rise time is performed.

In phase S3 at power ON the REG_EN node is pulled up by closing switch S1 (S2, S3 and S4 open) so that the REG_EN node is coupled via pull up resistor R1 and switch S1 to the high power line. If in this case no capacitor is coupled to the REG_EN node the state of the REG_EN node will rise rapidly while if a capacitor is present the rise will be less rapid. The rising time of the state of the REG_EN node is thus evaluated in this phase.

In phase S4 it is determined according to the measured rise time if a capacitor is present on the REG_EN node. If the measured rise time is below a time threshold it is considered that the CONFIG state is set at 0 while if the measured time is above the time threshold it can be determined that the CONFIG is set at 1. The REG_EN is forced to the high state by closing switch S3 (S1, S2 and S4 open) thereby providing a low impedance path L1 between the REG_EN node and the high power line. The power up phase finishes. A high REG_EN signal can thus be provided to the power regulator. This phase enables the charging of the capacitor to be completed when the presence of a capacitor is detected and thus the logic state of the REG_EN node to be stabilised.

In phase S5 the power is ON and the REG_EN node is maintained at the high state by means of pull up resistor R1 and closed switch S1 (S2, S3 and S4 open) thus providing a power regulator enabling function. At this stage the test mode can be enabled by setting the REG_EN node to a low state by opposing the logical state of the REG_EN node.

In phase S6 a power OFF request is received at the PMU sequencer 100. The REG_EN node is forced to a low state via low impedance path L2 by closing switch S4 (S1, S2 and S3 open). This action discharges any capacitor coupled to the REG_EN node.

In phase S7 the system returns to the original configuration where the REG_EN node is coupled to the GRD via pull down resistor R2 and switch S2 (S1, S3 and S4 open).

The embodiment of the invention hereinbefore described provides a specific control module for the multifunction node. It enables an opposition of the REG_EN node state (due to forcing an opposite state of the node) to be detected and the associated test mode enable signal to be generated.

It further allows any test mode enabling during power-up phase to be masked. In the power up phase, the external regulator enable signal can oppose by itself the state of the REG_EN node.

Moreover it allows a test mode enable signal to be enabled after the reception of a specific test mode command.

The control module according to the embodiment of the invention can route the test mode serial out signal when requested by a tester of the device using a specific test mode command.

Figure 3:
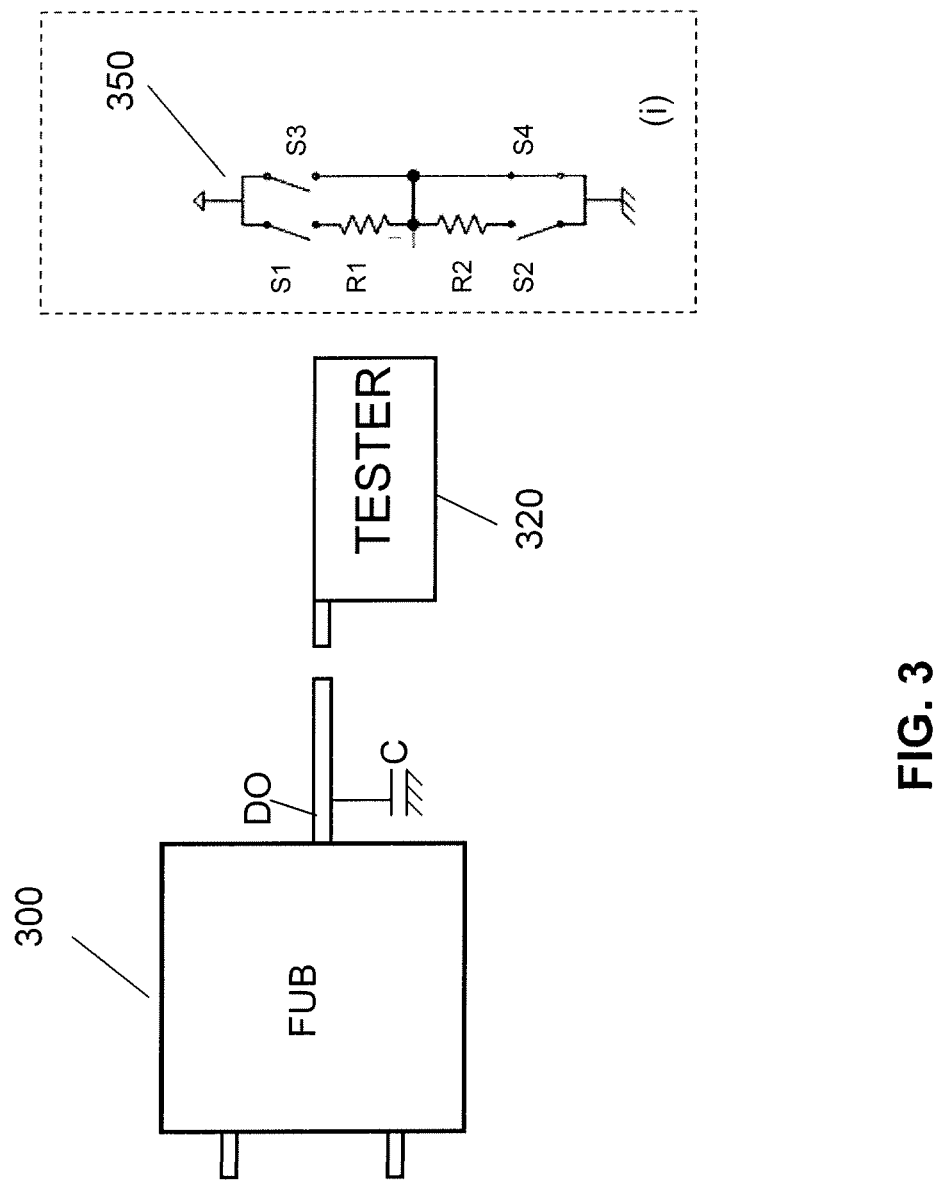
FIG. 3 is a schematic block diagram of a functional block of an integrated circuit according to the embodiment of the invention.

In a further embodiment of the invention as illustrated in FIG. 3 a functional unit block 300 has a digital output node DO. This output node DO is mainly static but toggles when function moves from one mode to another (at power-up for example). If the static states of this output DO can be maintained by pull-up/pull-down resistors, it is possible to extend application of embodiments of the invention to the node management of the functional unit block 300 in order to provide information such as configuration or modes of operation to the function by means of the single node DO. Switch arrangement 350 operates in a similar manner to the switch arrangement described above and is internal to the functional unit block 300.

By using a capacitor C to control the time taken to transition the state of the output DO node from 0 to 1 or from 1 to 0 and detecting this timing, the node DO can thus be configured to provide the functional unit block 300 with configuration information.

When the output DO is in static state, 0 or 1, forcing the output node to the DO opposite state 1 or 0 places the functional unit block 300 in a particular mode such as test mode in which a tester 320 can be connected to the DO node.

When the functional unit block is placed in test mode after forcing the output pin to opposite state, after programming a specific new mode in the function, the output pin can be reused to serve another usage such as outputting a data flow from the functional unit block 300.

Embodiments of the invention are thus able to provide at least the five described features to be implemented on a PMU sequencer provided with a limited number of nodes which in the described embodiment is 3 nodes. No additional specific nodes for providing a configuration signal input CONFIG or for providing a test mode enable input are necessary.

The circuitry described above may be disposed in an integrated circuit (IC) such as a system on a chip (SoC), and the IC may be incorporated into a system included in an electronic device such as a wireless communication device. The circuitry may be a component part of an IC chip or constitute itself an IC chip.

The method according to the embodiments of the invention can find applications in electronic devices such as wireless mobile devices such as but not limited to those comprising integrated circuits implementing EDGE, GSM or GPRS technology.

The embodiments of the present invention may be practiced in a variety of settings that implement a power management scheme in which power up and power down sequences are required, or having power management blocks or functional blocks with limited number of nodes on which the number of nodes may be reduced by applying embodiments of the invention Although the present invention has been described hereinabove with reference to specific embodiments, the present invention is not limited to the specific embodiments, and modifications will be apparent to a skilled person in the art which lie within the scope of the present invention that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A component of an electronic circuit, the component comprising:
 a node selectively configurable as an output node for providing an output signal to an external component or as an input node for providing an input signal to an internal component;
 a capacitor selectively couplable to the node to influence the time for the node to transition between a low state and a high state; and a timer for measuring the time for the node to transition between a low state and a high state to provide a first information input signal, the state of the first information signal depending on the time for the node to transition between the low state and the high state and being indicative of a first information;

a first input node and a second input node, wherein receiving a write command at the node enables a test mode operation of the circuit component, and, during the test mode operation, the first input node is operable as a serial input, the second input node is operable as a capture node, and the node functions as a test mode serial output node.

2. The circuit component according to claim 1 further comprising:

a driver to drive the node when it is in a static high state to a low state, or when it is in a static low state to a high state thereby providing a second information input signal indicative of a second information.

3. The circuit component according to claim 1 wherein the first information input signal is indicative of a mode of operation to be selected or a configuration of the circuit component and wherein the second information is indicative of the other of a mode of operation to be selected or a configuration command.

4. The circuit component according to claim 1 wherein the circuit component comprises:

a power sequencer unit and the node is a regulator enable output node.

5. The circuit component according to claim 1 further comprising:

a switch arrangement to selectively couple the node to a high power line or a low power line.

6. A wireless communication device including a component according to claim 1.

7. A method of managing a node of a component of an electronic circuit that also has a first input node and a second input node, the method comprising:

selectively coupling a capacitor to the node to influence the time for the node to transition between a low state and a high state;

measuring the time for the node to transition between a low state and a high state to provide a first information input signal, the state of the first information input signal depending on the time for the node to transition between the low state and the high state and providing a first information;

configuring the first input node to receive a serial input and the second input node as a capture node for a test mode operation; and receiving a write command at the node that enables the test mode operation, wherein the node functions as a test mode serial output node during the test mode operation.

8. The method according to claim 7 further comprising:

driving the node when it is in a static high state to a low state, or driving the node when it is in a static low state to a high state thereby providing a second information input signal indicative of a second information.

9. The method according to claim 7 wherein the first information input signal is indicative of a mode of operation to be selected or a configuration of the component and wherein the second information is indicative of the other of a mode of operation to be selected or a configuration of the component.

10. The method according to claim 7 wherein the circuit component comprises:

a power sequencer unit and the node is a regulator enable output node.

11. A non-transitory computer readable medium storing computer interpretable instructions for managing a node of a component of an electronic circuit that also has a first input node and a second input node, the instructions comprising:

a first set of instructions adapted to selectively couple a capacitor to the node to influence the time for the node to transition between a low state and a high state;

a second set of instructions adapted to measure the time for the node to transition between a low state and a high state to provide a first information input signal, the state of the first information input signal depending on the time for the node to transition between the low state and the high state and providing a first information; and an additional set of instructions adapted to enable a test mode operation upon receiving a write command, and to configure the node to function as a test mode serial output node, the first input node to receive a serial input and the second input node to operate as a capture node during the test mode operation.

12. The non-transitory computer readable medium storing computer interpretable instructions according to claim 11 further comprising:

a third set of instructions adapted to drive the node when it is in a static high state to a low state, or driving the node when it is in a static low state to a high state thereby providing a second information input signal indicative of a second information.

13. The non-transitory computer readable medium storing computer interpretable instructions according to claim 11 wherein the first information input signal is indicative of a mode of operation to be selected or a configuration of the component and wherein the second information is indicative of the other of a mode of operation to be selected or a configuration of the component.

14. The non-transitory computer readable medium storing computer interpretable instructions according to claim 11 wherein the circuit component comprises:

a power sequencer unit and the node is a regulator enable output node.

* * * * *